United States Patent

Ito et al.

[11] Patent Number: 5,889,337
[45] Date of Patent: Mar. 30, 1999

[54] INTEGRATED INSTRUMENT PANEL SWITCH ASSEMBLY

[75] Inventors: Tadashi Ito; Kenji Okamoto; Hiroaki Yamazaki; Tomokazu Ito; Yukio Kide, all of Nagoya, Japan

[73] Assignees: Sumitomo Wiring Systems, Ltd.; Harness System Technologies Research, Ltd.; Sumitomo Electric Industries, Ltd., all of, Japan

[21] Appl. No.: 844,134

[22] Filed: Apr. 18, 1997

[30] Foreign Application Priority Data

Apr. 23, 1996 [JP] Japan .................................. 8-101489

[51] Int. Cl.⁶ ...................................................... B60L 1/00
[52] U.S. Cl. ............................................................ 307/10.1
[58] Field of Search ...................... 307/9.1, 10.1, 307/147; 439/34; 701/36, 49; 200/5 R, 5 A, 293; 381/81, 86; 361/664, 641–648, 600, 601, 622, 624, 626, 647, 628–631, 668, 752, 775

[56] References Cited

U.S. PATENT DOCUMENTS 5,589,715 12/1996 Nishitani et al. ..................... 307/10.1
5,627,409 5/1997 Nishitani ............................. 307/10.1

*Primary Examiner*—Richard T. Elms
*Attorney, Agent, or Firm*—Jordan B. Bierman; Bierman, Muserlian and Lucas

[57] ABSTRACT

A vehicle electronic apparatus (1) includes an electronic control section (2) received in an accommodation cavity (23) in an instrument panel (22) in a vehicle for effecting an electronic function in the vehicle, a switch section (3) detachably attached to the electronic control section (2) for controlling the electronic control section (2), and a cover panel (4) to be fitted in the accommodating cavity (23) in the instrument panel (22) to cover the switch section (3) at the front side. It is possible to use in common the electronic section (2) which is an expensive electronic element and also to design the cover panel (4) with flexibility. The switch section (3) can be produced in compliance with the designed cover panel (4). A common use of electronic parts will achieve a reduction of cost and enhance a flexibility in design of an interior of the vehicle.

2 Claims, 4 Drawing Sheets

INTEGRATED INSTRUMENT PANEL SWITCH ASSEMBLY

BACKGROUND OF THE INVENTION

This invention relates to a vehicle electronic apparatus which is attached to an instrument panel in a vehicle and controls vehicle electronic equipment such as an air conditioner, an audio system, a car navigation system, and the like.

Heretofore, such a vehicle electronic apparatus includes an electronic control section which controls electronic equipment such as an air conditioner, a car navigation system, and the like, manual switches which are provided on the front side of the electronic control section and send command signals from a driver to the electronic equipment, and a cover panel which is mounted on the front side of the manual switches. These elements are formed together as a single unit. When a single or plural electronic apparatuses are put or piled on each other in an accommodating cavity in the instrument panel, the cover panel is aligned with the instrument panel with respect to a single plane. Accordingly, the driver can control the vehicle electronic equipments concentrically and the cover panel keeps a good appearance of interior of a vehicle.

There are various kinds of automotive vehicles such as a sedan, a sport car, and the like. Interiors of the vehicles are different in accordance with the types of vehicle.

However, the electronic control section, manual switches, and cover panel are formed together as a single unit. In the case where the electronic control section which takes a great part of cost in the vehicle electronic apparatus is used in common in different vehicles in order to reduce the cost of the vehicle, the cover panel is limited in its shape and design, thereby making it more difficult to distinguish each class of the vehicle.

Since this problem will weaken a competitive power of the vehicle in the modern times when a personal taste has become various, this problem should be overcome by all means.

SUMMARY OF THE INVENTION

An object of the present invention is to provide an electronic control apparatus which can use in common electronic parts to reduce a cost of a vehicle and can enhance a flexibility of design of the vehicle.

In order to achieve the above object, a vehicle electronic apparatus in accordance with the present invention comprises: an electronic control section received in an accommodating cavity in an instrument panel in a vehicle for controlling electronic equipment in the vehicle; and a switch section detachably connected to the electronic control section and having manual switches by which a driver gives command signals to the electronic control section. The switch section is formed together with a cover panel to be adapted to close the accommodating cavity.

Since the electronic control section is separated from the switch section in the vehicle electronic apparatus of the present invention, it is possible to decrease a cost of the vehicle by using in common the electronic control section among another vehicles and to design the switch section together with the cover panel to accord with the interior of the vehicle, thereby enhancing the flexibility in design of the vehicle.

Also, the electronic control section is coupled to a receiving connector mounted in the accommodating cavity when the electronic control section is inserted into the accommodating cavity. Thus, it is possible to simplify an assembling process of the vehicle since a connection between the electronic control section and the electronic equipment such as an actuator and the like has been completed if the electronic control section is contained in a built-in formation in the accommodating cavity in the instrument panel.

The electronic control section and the switch section may be coupled to each other by means of multiplex communication. Thus, it is possible to decrease the number of connector pins which interconnect the electronic control section and the switch section.

DETAILED DESCRIPTION OF THE PREFERRED EMBODIMENTS

Referring now to FIGS. 1 to 4, an embodiment of vehicle electronic apparatus in accordance with the present invention will be described below.

Figure 1:
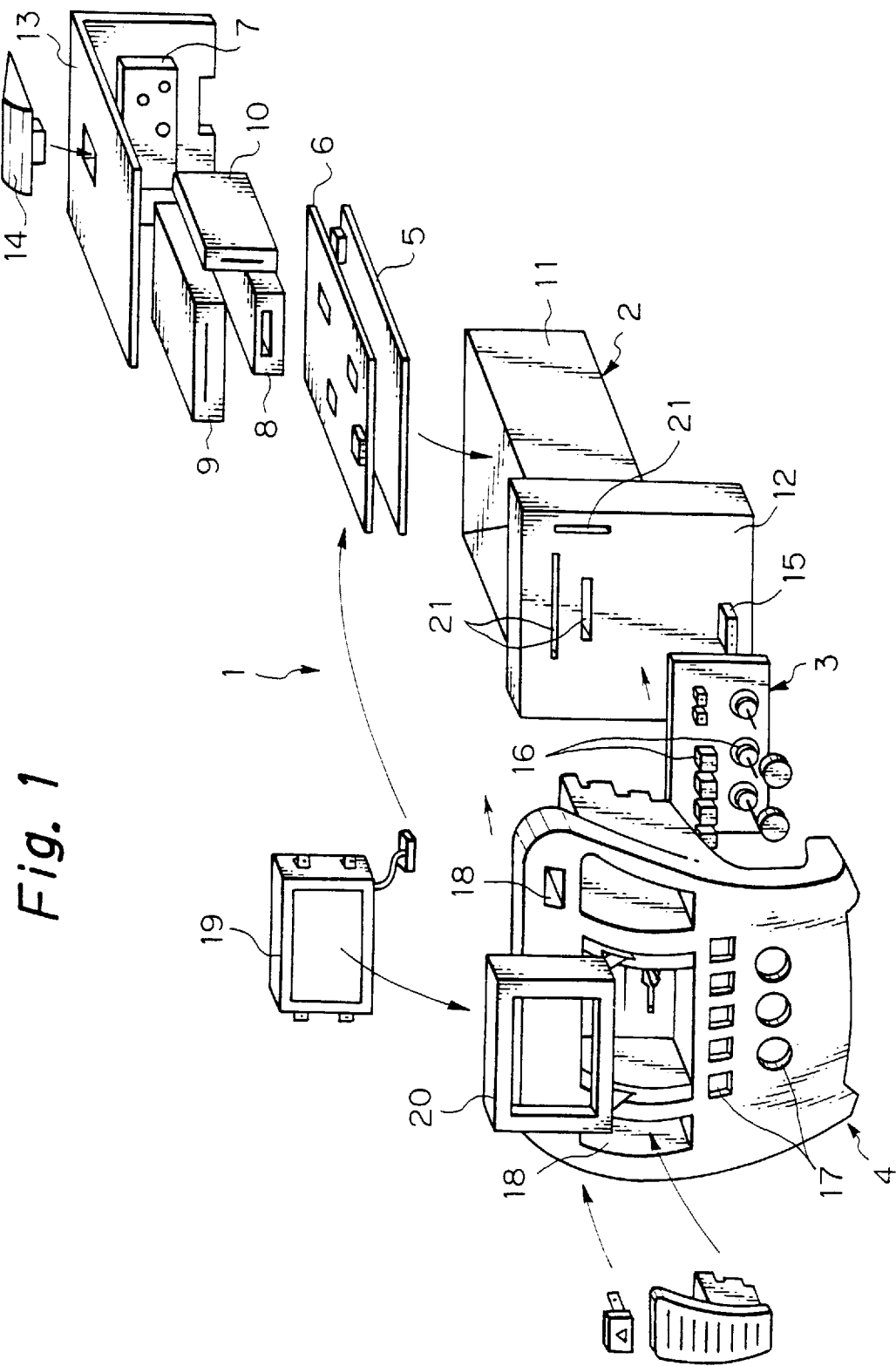
FIG. 1 is an exploded perspective view of an embodiment of a vehicle electronic apparatus in accordance with the present invention.

A vehicle electronic apparatus 1 or an electronic apparatus 1 installed in an automotive vehicle, shown in FIG. 1, comprises a switch panel 3 having manual switches 16 which a driver operates, a cover panel 4 which puts on the switch panel 3 at the front side and holds it, and an electronic control unit 2 which is detachably coupled to the switch panel 3 and is adapted to mount various kinds of electronic units.

The electronic control unit 2 comprises a system-accommodating section 11 for containing each of electronic units which are selected by a grade of an automobile vehicle and a driver's taste and a control section 12 for controlling each of the electronic units 5 to 10 described below. The electronic units include, for example, a system board such as a car navigation system board 5, an audio visual (AV) system board 6, an alternating current (AC) control board 7, or the like, and a drive unit such as a cassette deck unit 8, a compact disc (CD) drive unit 9, an integrated circuit (IC) card drive unit 10 or the like. The control section 12 is connected through each wire harness (not shown) to each of the electronic units 5 to 10 contained in the system-accommodating section 11. Also, an antenna 14 for a global positioning system (GPS) and a vehicle information and communication system (VICS) is attached to a cover 13.

The switch panel 3 is coupled to a connector 15 mounted on a front side of the control section 12 through a wire harness (not shown) or a connector (not shown) directly.

Manual switches 16 which send manual command signals are disposed on the switch panel 3.

The switch panel 3 is attached to the cover panel 4 at the rear side. The cover panel 4 is detachably attached to the electronic control unit 2 to enhance appearance of the vehicle electronic control apparatus 1.

The cover panel 4 is provided with switch holes 17 through which the manual switches 16 on the switch panel 3 extend and openings 18 which receive an air outlet and a hazard switch. The cover panel 4 also supports a display holder 20 which holds a liquid crystal display 19. The liquid crystal display 19 held on the display holder 20 is connected to a video controller (not shown) on the AV system board 6.

The cover panel 4 and electronic control unit 2 are provided with slits 21 through which a cassette tape, a CD disk, or an IC card comes into and out of the respective drive units 8, 9, and 10.

Figure 2:
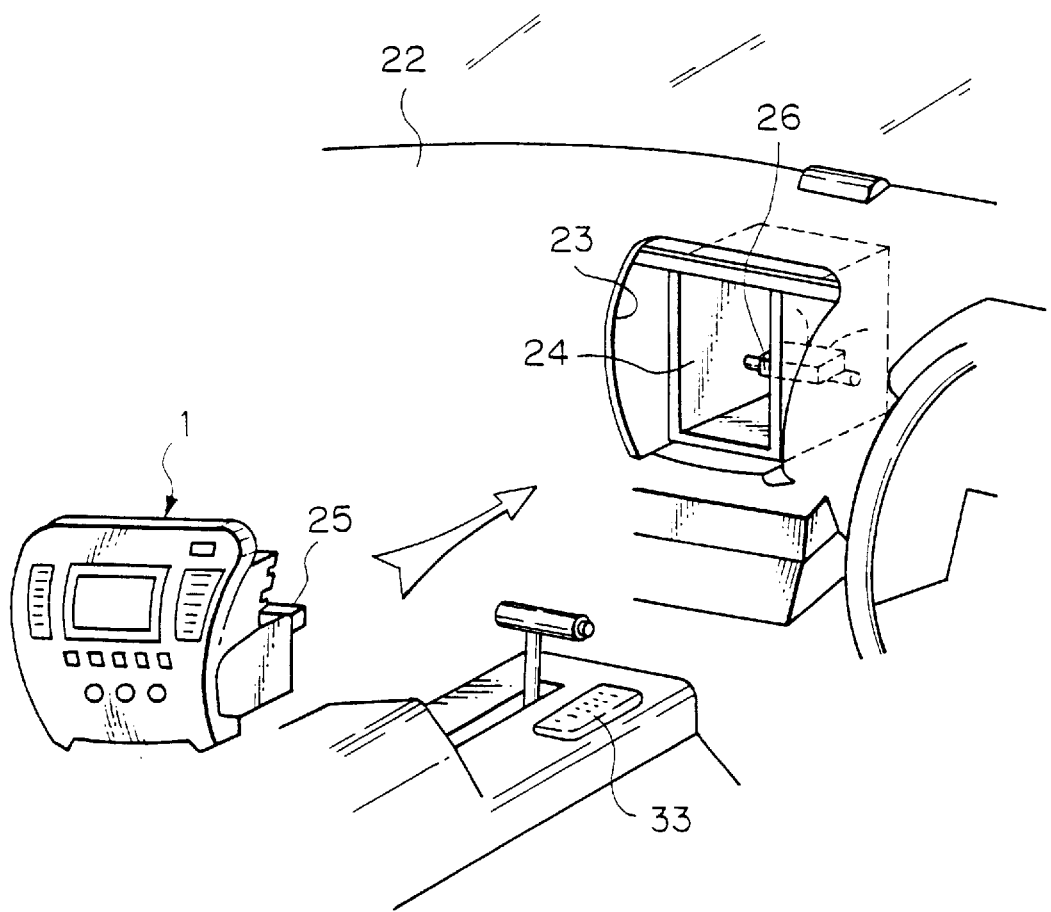
FIG. 2 is a perspective view of a partial interior of an automotive vehicle, illustrating an attachment of the vehicle electronic apparatus shown in FIG. 1 onto an instrument panel of the vehicle.

The vehicle electronic control apparatus 1, as shown in FIGS. 1 and 2, is fitted in an accommodating cavity 23 in an instrument panel 22 in the automotive vehicle, after the apparatus 1 is assembled as a single unit.

A bracket 24 is secured to the accommodating cavity 23 in the instrument panel 22 in order to fix the vehicle electronic apparatus 1 in the cavity 23. A receiving connector 26 is secured to the bracket 24 so that a connector 25 for a bus is coupled to the receiving connector 26 when the vehicle electronic apparatus 1 is inserted into the bracket 24 in the accommodating cavity 23. The connector 25 is mounted on the rear side of the system-accommodating section 11 (FIG. 1) of the vehicle electronic apparatus 1.

The bus connector 25 is an external input and output port in which the respective electronic units 5 to 10 control the vehicle electronic equipment, for example, an air compressor and a CD changer while the receiving connector 26 is coupled to each electronic equipment through the vehicle LAN and the like.

Figure 3:
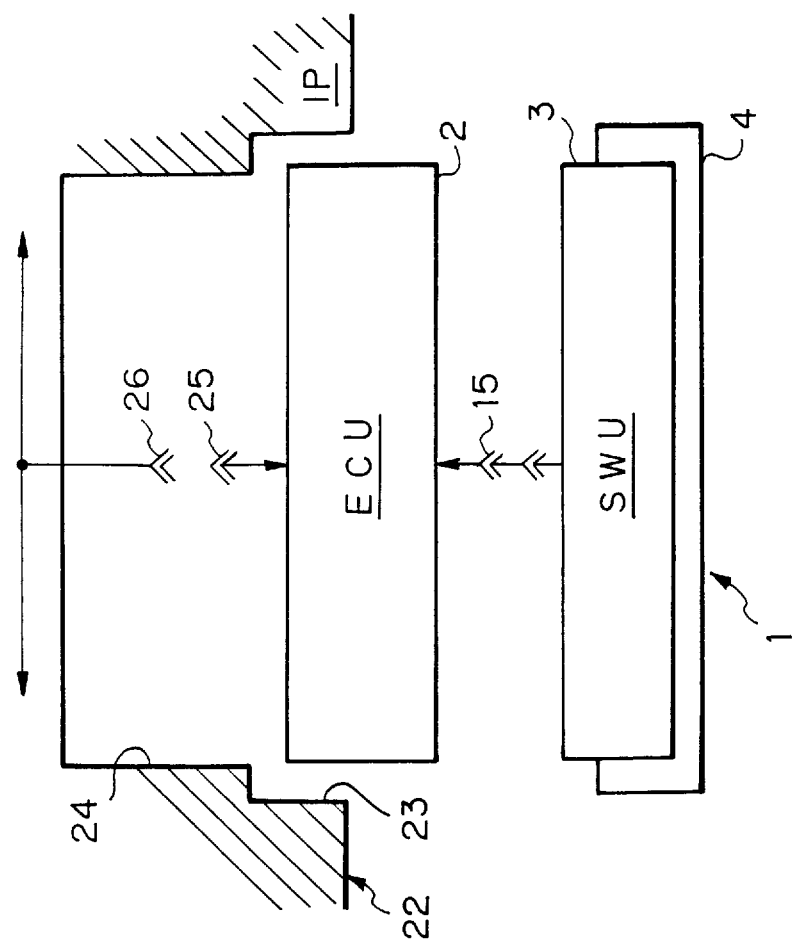
FIG. 3 is a block diagram of the vehicle electronic apparatus shown in FIG. 2, illustrating an attachment of the apparatus onto the instrument panel; and, FIG. 4 is a block diagram of the vehicle electronic apparatus shown in FIG. 3.

Accordingly, as shown in FIG. 3, when the vehicle electronic apparatus 1 is fitted in the accommodating cavity 23 in the instrument panel 22 in a built-in manner, the bus connector 25 is coupled to the receiving connector 26, thereby completing a necessary wiring connection. This makes it simple to assemble the apparatus 1 in the vehicle.

Figure 4:
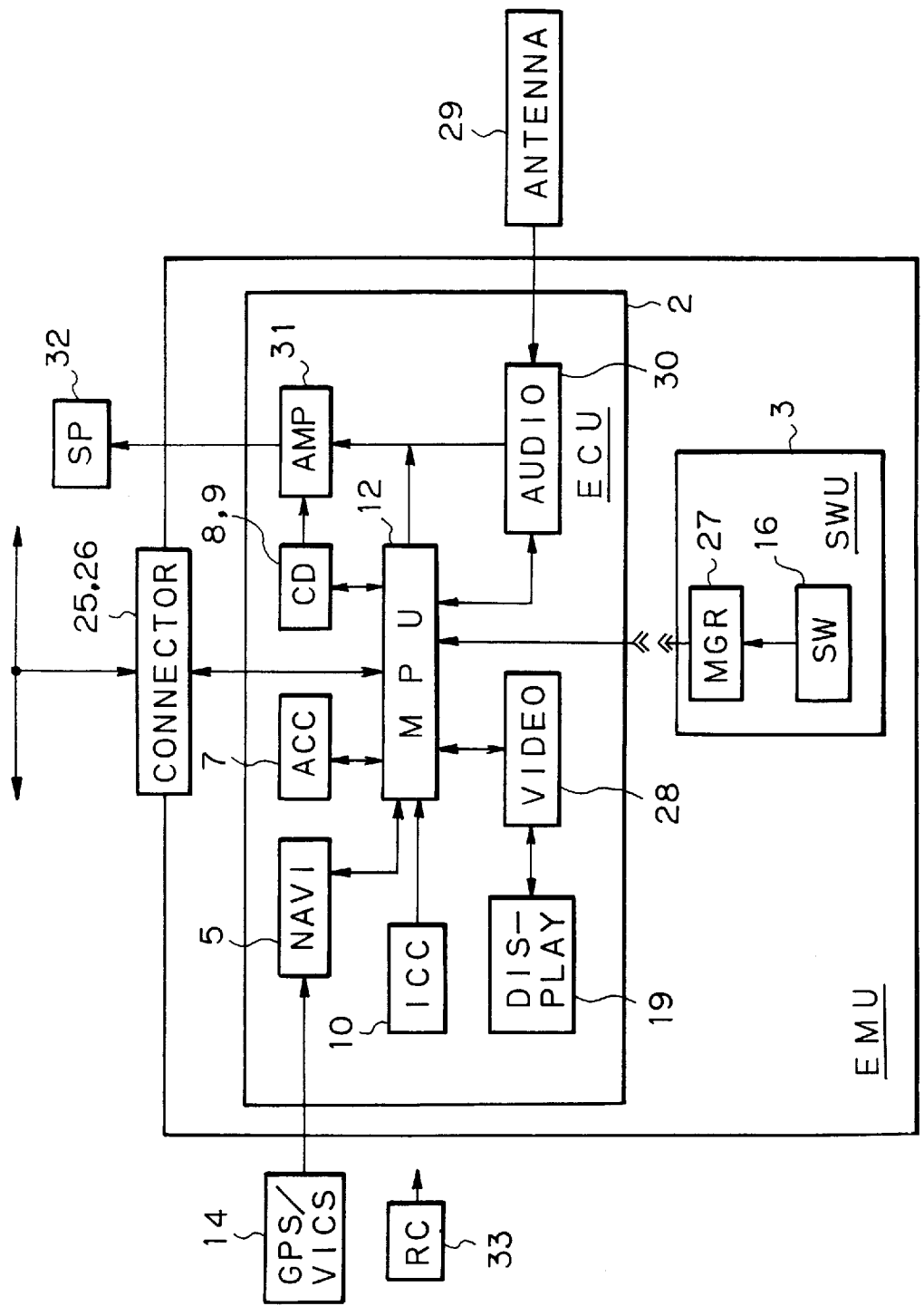

As shown in FIG. 4, in the vehicle electronic apparatus 1, a command signal from the manual switch 16 on the switch panel 3 is transmitted through a communication manager 27 to the electronic control unit 2. The communication manager 27 transmits in series the command signal from the manual switch 16 to the control section 12 of the electronic control unit 2 by the time-division multiplex communication.

The control section 12 of the electronic control unit 2 also controls the respective electronic units 5 to 10 in accoradance with the indication from the switch panel 3 and the judgement by itself.

The control section 12 indicates on the liquid crystal display 19 a playback condition from a CD or a cassette tape, navigation information from the car navigation system board 5 and antenna 14, and the like through the video controller 28 of the AV system board 6. Also, the control section 12 mixes a voice from a radio set or a television set which receives electric waves through the antenna 29 by the audio controller 30 of the system board 6 or a voice from the CD or the cassette tape with a voice of a voice navigation from the car navigation system board 5 or the antenna 14 and then the mixed voice is output from a speaker 32 through an amplifier 31. Accordingly, the driver can get the indication from the voice navigation without interrupting the music.

Also, the vehicle electronic control apparatus 1 may receive the indication on the liquid crystal display 19 from the driver by so-called display touch formation. A software for carrying out this operation is installed in an IC card to be inserted in the IC card drive unit 10 and is made in version-up.

Further, the vehicle electronic control apparatus 1 can be operated at remote position by a remote controller 33.

As described above, it is possible in accordance with the present invention to use in common use the most expensive electronic control unit 2 among the various kinds of vehicle, thereby decreasing a cost of the vehicle electronic apparatus 1, because the electronic control unit 2 is separated from the switch panel 3 integrated with the cover panel 4 and the unit 2 can be detachably connected to the panel 3. In this case, addition and extension of the system boards 5, 6, and 7 and/or the drive units 8, 9, and 10 can reply to requirements of the vehicle class and driver's taste. Also, since it is possible to freely design the cover panel 4 to accord with an appearance of vehicle, a flexibility in design of the interior can be enhanced, thereby enabling various kinds of vehicle to be distinguished from each other and increasing a value of goods. The switch panel 3 can be produced every vehicle to accord with the designed cover panel 4.

In the prior vehicle electronic apparatus, since the respective electronic units 8 and 9 are piled in several steps and contained in the accommodating cavity 23 in the instrument panel 22, boundary lines are caused among the respective cover panels 4 which are fitted in the accommodating cavity 23 to cover the front sides of the electronic units 8 and 9. This will deteriorate a quality in design. However, the vehicle electronic apparatus 1 according to the present invention can eliminate the boundary line by means of a sheet of cover panel 4, thereby enhancing the appearance of interior.

The vehicle electronic apparatus of the present invention can increase a flexibility in design of interior of a vehicle while decreasing a cost of vehicle, thereby enhancing a value of goods and a competitive power of goods.

What is claimed is:

1. An electronic apparatus for a vehicle comprising an accommodating cavity in an instrument panel in a vehicle, an electronic control section controlling vehicular electronic equipment contained in said electronic control section, a switch section containing manual switches by which command signals are given to said electronic control section, and a cover panel adapted to close said accommodating cavity, said accommodating cavity adapted to receive said electronic control section, said electronic control section, when in said accommodating cavity, being connected to a wire harness in said vehicle, said switch section being detachably connected to said electronic control section and unitary with said cover panel, said electronic control section and said switch section being coupled to each other by means of multiplex communication.

2. The electronic apparatus of claim 1 wherein said electronic control section is coupled to a receiving connection when in said accommodating cavity.

* * * * *